United States Patent [19]

Howell

[11] Patent Number: 4,675,776
[45] Date of Patent: Jun. 23, 1987

[54] BISTABLE UNDERVOLTAGE RELEASE CIRCUIT FOR CIRCUIT BREAKERS

[75] Inventor: Edward K. Howell, Simsbury, Conn.
[73] Assignee: General Electric Company, New York, N.Y.
[21] Appl. No.: 674,451
[22] Filed: Nov. 23, 1984
[51] Int. Cl.[4] .............................................. H02H 3/24
[52] U.S. Cl. ....................................... 361/92; 361/86; 361/156; 361/205
[58] Field of Search ........................ 361/33, 86, 88, 89, 361/92, 156, 205, 208; 335/20; 328/67

[56] References Cited

U.S. PATENT DOCUMENTS

| | | | |
|---|---|---|---|
| 3,784,846 | 1/1974 | Krick et al. | 361/92 X |
| 3,950,675 | 4/1976 | Weber et al. | 361/205 X |
| 4,011,484 | 3/1977 | Paice et al. | 361/59 |
| 4,016,518 | 4/1977 | Lang et al. | 335/20 X |
| 4,068,276 | 1/1978 | Pintell | 361/92 X |
| 4,097,831 | 6/1978 | Jencks et al. | 335/20 X |
| 4,206,430 | 6/1980 | Rusch et al. | 335/20 |
| 4,527,216 | 7/1985 | Stammely | 361/208 X |

Primary Examiner—A. D. Pellinen
Assistant Examiner—Derek S. Jennings
Attorney, Agent, or Firm—Richard A. Menelly; Walter C. Bernkopf; Fred Jacob

[57] ABSTRACT

A control circuit combined with a magnetically bistable solenoid armature provides a bistable undervoltage release function to a circuit breaker. The solenoid is fabricated from a material having high magnetic remnance and low coercivity. A first signal to the solenoid coil develops a high remnance flux to hold the armature against a spring force. A second signal, of opposite polarity and predetermined voltage, produces an opposing magnetic flux to cancel that retained by the solenoid. The armature then becomes extended under the influence of a charged spring to trip the breaker.

14 Claims, 2 Drawing Figures

BISTABLE UNDERVOLTAGE RELEASE CIRCUIT FOR CIRCUIT BREAKERS

BACKGROUND OF THE INVENTION

Means are currently available for interrupting the circuit to an electric motor when the motor voltage is less than operational in order to prevent damage to the motor. U.S. Pat. No. 4,097,831 to C. L. Jencks et al. assigned to the common assignee of the instant invention, describes an undervoltage accessory for use with insulated case circuit breakers. The undervoltage facility is provided by a solenoid containing an armature which is spring-loaded for engaging the breaker tripping mechanism. The presence of a voltage of a predetermined value on the solenoid winding produces sufficient magnetic flux to hold the armature against the spring force. In the event that the voltage decreases in value, or becomes interrupted, the flux provided by the solenoid winding is insufficient to overcome the spring force causing the armature to extend and engage the breaker tripping mechanism.

It is disadvantageous for the undervoltage release trip mechanism to become activated upon a momentary undervoltage condition. This is especially true when the motor is involved in a complex manufacturing operation and time is taken to investigate the cause of the tripping occurrence. In some instances, the circuit breaker must be manually reset.

U.S. Pat. No. 4,011,484 assigned to the United States Government, describes an undervoltage release having an electrical reset for the circuit breaker. The automatic reset function is designed to start the motor when the voltage attains the correct operating value. An automatic reset function for electric motors however is not always desirable. In some instances, it could restart the motor at an inopportune time in a manufacturing process resulting in injury to personnel as well as to product. It would be more advantageous to delay tripping the motor supply upon the occurrence of temporary undervoltage conditions of short duration.

The purpose of this invention is to provide a magnetically bistable tripping mechanism in combination with a control circuit to delay the tripping operation during spurious undervoltage conditions and to trip the supply voltage circuit breaker when the undervoltage condition persists for a predetermined period of time.

SUMMARY OF THE INVENTION

An undervoltage release unit (UVR) having a bistable magnetic armature is employed with a control circuit to provide a bistable UVR for use with a circuit breaker protected electric motor for example. The UVR magnetic armature arranged within a solenoid winding is selected to have a high magnetic remnance and a low coercivity. A first pulse of current within the solenoid winding holds the armature against the bias of a charged spring. If the undervoltage condition persists for a predetermined time period, a second pulse is generated within the solenoid winding in opposite polarity to the first pulse. The electromagnetic field produced in the solenoid winding by the second pulse opposes the magnetic flux produced by the first pulse causing the armature to extend under the influence of the charged spring.

DESCRIPTION OF THE PREFERRED EMBODIMENT

Figure 1:
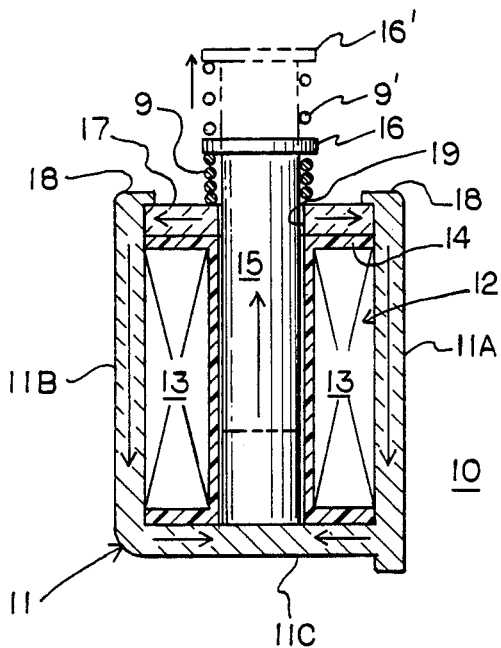
FIG. 1 is a side view, in partial section, of a solenoid bistable undervoltage release of the instant invention.

FIG. 1 contains a UVR solenoid 10 which includes a frame 11 having a right sidewall 11A, left sidewall 11B and a bottom 11C. Frame 11 is generally fabricated from a readily magnetizable material, such as cold-rolled steel. A solenoid 12, containing a solenoid coil 13, arranged around a bobbin 14 is used to generate an electromagnetic field within which armature 15 is concentrically positioned. A plate 16 formed at one end of the armature contacts the tripping mechanism on an associated circuit breaker when extended to the position indicated in phantom at 16' as described for example in the aforementioned patent to Jencks et al. A top member 17 is attached to a top portion of frame and retained by means of tabs 18 formed from the sidewalls 11A, 11B. A clearance hole 19 through the top member allows for reciprocal motion of the armature but retains the armature within the magnetic influence of the solenoid coil 13. The armature is retained against the bias of a compression spring 9 arranged around the armature. For purposes of providing a bistable magnetic function, a material such as high carbon steel having a high degree of magnetic remnance and low magnetic coercivity is chosen for at least some portion of the magnetic path provided through the armature and the top, bottom and side walls of the frame as indicated. The magnetic path is broken by demagnetizing the armature thereby allowing the armature to become extended by the charged spring.

Figure 2:
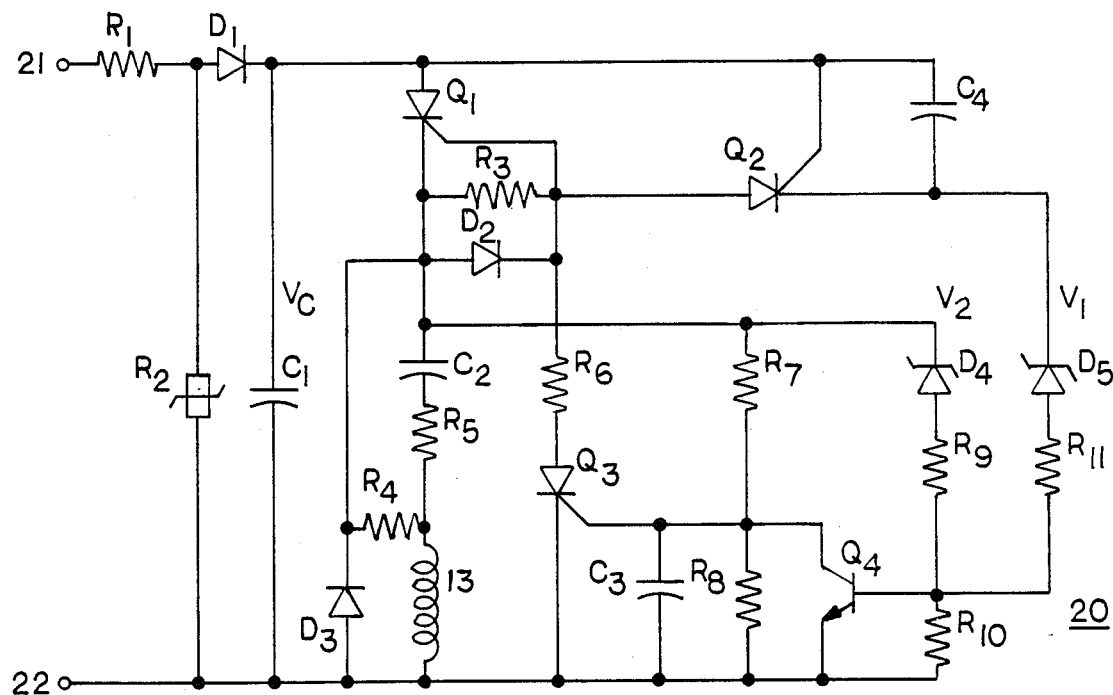
FIG. 2 is a schematic representation of a control circuit for use with the trip unit of FIG. 1.

The control circuit 20 shown in FIG. 2 supplies the current pulses to the solenoid coil 13 and has a pair of terminals 21, 22 across which the control voltage supplied to the controlled motor circuit is also applied. The circuit consists of a plurality of linear resistors $R_1$, $R_3$–$R_{11}$, non-linear resistor $R_2$, capacitors $C_1$–$C_3$, diodes $D_1$, $D_2$, zener diodes $D_4$, $D_5$, thyristors $Q_1$–$Q_3$, transistor $Q_4$ and solenoid coil 13. Thyristors $Q_1$–$Q_3$ are connected in the following manner. The anode of $Q_1$ is directly connected to the gate of $Q_2$ and the cathode of $Q_1$ is connected through capacitor $C_2$, resistor $R_5$, trip coil 13 to the cathode of $Q_3$. The gate of $Q_1$ is directly connected to the anode of $Q_2$ and with the anode of $Q_3$ through resistor $R_6$. The gate and cathode of $Q_3$ are connected respectively to the collector and emitter of transistor $Q_4$. The base of $Q_4$ is connected through resistor $R_{10}$ to the cathode of $Q_3$ and to the cathode of $Q_1$ through the series combination of resistor $R_9$ and zener diode $D_4$. The base of $Q_4$ is connected to the cathode of $Q_2$ through the series combination of resistor $R_{11}$ and diode $D_5$. The cathode of $Q_2$ is connected to the gate of $Q_2$ through capacitor $C_4$. Resistor $R_8$ and capacitor $C_3$ are connected in parallel with the collector and emitter of $Q_4$ and with the gate and cathode of $Q_3$. Resistor $R_7$ is connected between the collector of $Q_4$ and the cathode of $Q_1$. The cathode of $Q_3$ is connected with the cathode of $Q_1$ through diode $D_3$. Resistor $R_4$ is connected between the cathode of $D_3$ and one side of trip coil 13. Diode $D_2$ and resistor $R_3$ are connected in parallel across the cathode and gate of thyristor $Q_1$. Capacitor $C_1$ is connected in parallel with the anode of $Q_1$ and the anode of $D_3$, and in series with diode $D_1$ and resistor $R_1$ back to terminal 21. Non-linear resistor $R_2$ is connected to terminal 22 at one end and to the connection between one end of resistor $R_1$ and the anode of $D_1$. When terminals 21, 22 are connected across the control voltage applied to the protected motor, capacitor $C_1$ becomes charged to the positive peak value of the control voltage. As long as the voltage across $C_1$ exceeds the voltage $V_1$ across zener diode $D_5$, current flow through diode $D_5$ and resistor $R_{11}$ turns on transistor $Q_4$ which functions as, and can be replaced with, a PNP and thyristor $Q_2$ transistor, wherein the gate of $Q_2$ serves as the emitter, the cathode of $Q_2$ serves as the base, and the anode of $Q_2$ serves as the collector of the pnp transistor. Current flow from gate to cathode of $Q_2$, through diode $D_5$, causes current to flow from gate to anode of $Q_2$ and through resistor $R_3$ and the gate of thyristor $Q_1$. Thyristor $Q_1$ becomes conductive and charges capacitor $C_2$ through $Q_1$, resistor $R_5$ and the solenoid coil 13 with a current pulse sufficient to retain armature 15 in a non-trip condition. When the control voltage across terminals 21, 22 is reduced to a value less than $V_1$ but greater than the voltage $V_2$ across zener diode $D_4$, current no longer flows through thyristor $Q_2$ and diode $D_5$. Current flow through diode $D_4$ and resistor $R_9$, however, maintains transistor $Q_4$ conducting and saturated. When the control voltage $V_c$ drops below $V_2$, current no longer flows through diode $D_4$ and transistor $Q_4$ while thyristor $Q_3$ becomes triggered by current flow through resistor $R_7$, and capacitor $C_2$ discharges through resistor $R_6$, thyristor $Q_3$, trip coil 13 and resistor $R_5$. The current flow through the solenoid coil produces an electromagnetic force in opposition to the remnant magnetic force causing armature 15 to become extended under the influence of spring 9 to trip the breaker. When the breaker is manually reset, armature 15 is retained by the magnetic field produced by the energized solenoid winding provided that the control voltage $V_c$ exceeds voltage $V_1$.

When the UVR is used in combination with a shunt trip type circuit breaker, a signal is applied to solenoid coil 13 from the trip unit circuit to trip the breaker upon over current conditions only upon command. It is readily understood that a single bistable UVR can be multi-functionally employed for both overcurrent tripping on command as well as for providing undervoltage release within the same circuit.

Having described my invention, what I claim as new and desire to secure by Letters Patent is:

1. A bistable undervoltage release comprising:
a metal support frame; and
a solenoid winding arranged around a magnetically bistable armature on said support frame, said armature forming a magnetic path with said support frame when magnetized to resist extension away from said solenoid winding under the bias of a charged spring, said armature becoming magnetized by a pulse of current of a first polarity to said solenoid winding and said armature becoming demagnetized by a pulse of current of a second polarity to said solenoid winding.

2. The bistable undervoltage release of claim 1 wherein said armature breaks said magnetic path when demagnetized to thereby become extended by said charged spring to trip a circuit breaker.

3. The bistable undervoltage release of claim 1 wherein said metal support frame comprises a magnetic steel.

4. The bistable undervoltage release of claim 1 wherein said armature comprises a high carbon steel.

5. A bistable undervoltage release comprising:
a metal support frame;
electromagnetic means on said support frame arranged for in response to at least one electric pulse when a sensed voltage remains below a predetermiend value for a predetermined time; and
control circuit means connected with said electromagnetic means for providing at least one electric pulse of a first polarity to said electromagnetic means for preventing said electromagnetic means from tripping said breaker when said voltage is above said predetermined value and for providing at least one electric pulse of an opposite polarity to cause said electromagnetic means to trip said breaker when said voltage remains below said predetermined voltage for a predetermined time, said electromagnetic means comprising a solenoid coil containing a moveable magneticaly bistable armature arranged for reciprocal movement in and out of said solenoid coil, said armature comprising a magnetically susceptible material having both magnetic remnance and magnetic coercivity for holding said armature within said solenoid coil when said pulse of first polarity is provided to said solenoid coil and for extending said armature out of said solenoid coil when said pulse of opposite polarity is provided to said solenoid coil.

6. The bistable undervoltage release of claim 5 wherein said armature comprises a high carbon steel.

7. The bistable undervoltage release of claim 5 wherein said frame comprises a high carbon steel.

8. The bistable undervoltage release of claim 5 further including a spring force biased to assist said armature to trip said breaker.

9. The bistable undervoltage release of claim 5 wherein said control circuit means includes a transistor connected with a pair of terminals and said solenoid coil for providing said electric pulse of said first polarity to said solenoid coil when a voltage above said predetermined value appears across said solenoid coil and for providing said electric pulse of said opposite polarity to said solenoid coil when a voltage below said predetermined appears across said solenoid coil for said predetermined time.

10. The bistable undervoltage release of claim 9 including a first voltage controlled diode connected with said transistor for switching said transistor when said first voltage appears across said terminals, and a second voltage control diode connected with said transistor for switching said transistor when said second voltage appears across said terminals.

11. The bistable undervoltage release of claim 10 including a first capacitor connected across said pair of terminals for charging to said first voltage to provide said pulse of said first polarity to said solenoid coil when said first voltage controlled diode turns on, and a second capacitor connected to said solenoid coil through a resistor for providing said pulse of said opposite polarity to said solenoid coil when said second voltage controlled diode turns off.

12. The bistable undervoltage release of claim 11 including a base of said transistor commonly connected with said first and second voltage controlled diodes, a collector of said transistor connected with said first and said second capacitors, and an emitter of said transistor connected with said solenoid coil whereby said first and said second pulses become transmitted to said solenoid coil upon receipt of first and second control currents at said transistor base from said first and said second voltage controlled diodes.

13. The bistable undervoltage release of claim 11 including a first thyristor connected in series with said first capacitor and said solenoid coil and a second thyristor serially connected with said second capacitor and said solenoid coil, the gate of said second thyristor being connected with the collector of said transistor for providing said second pulse of said first and opposite polarity to said solenoid coil through said control transistor.

14. The bistable undervoltage release of claim 10 wherein said first and second voltage control diodes comprise zener diodes.

* * * * *